United States Patent

[11] 3,599,435

| [72] | Inventor | Robert H. Kolb |
| | | Cypress, Tex. |
| [21] | Appl. No. | 853,720 |
| [22] | Filed | Aug. 28, 1969 |
| [45] | Patented | Aug. 17, 1971 |
| [73] | Assignee | Shell Oil Company |
| | | New York, N.Y. |

[54] METHOD FOR LAYING COATED PIPELINES UNDERWATER
5 Claims, 8 Drawing Figs.

[52] U.S. Cl. .................................................. 61/72.1,
　61/72.2, 138/141, 138/145, 156/429, 156/430,
　264/34
[51] Int. Cl. .................................................. F16l 1/00,
　F16l 9/14
[50] Field of Search .................................................. 61/72.1,
　72.2, 72.3, 72.5, 72.7; 285/292, 294; 138/141,
　140, 145, 146; 156/429, 430; 264/34, 35

[56] References Cited
UNITED STATES PATENTS

| 2,596,490 | 5/1952 | Jenkins............................ | 138/146 |
| 2,605,202 | 7/1952 | Reynolds......................... | 61/72.2 X |
| 3,284,110 | 11/1966 | Marcus et al. ................ | 285/292 |
| 3,390,532 | 7/1968 | Lawrence....................... | 61/72.3 |

*Primary Examiner*—Jacob Shapiro
*Attorneys*—Louis J. Bovasso and J. H. McCarthy ABSTRACT: A method and apparatus for laying a pipeline underwater by coating a substantial portion of the pipeline with a corrosion-preventing masticlike material in its soft state, the material having a tendency to flow plastically. A plurality of raised portions are formed in the outer surface of the masticlike material while the material is in its soft state and the material including the raised portions is solidified. A cementatious material is applied over the hardened masticlike material; the cementatious material is then solidified and the coated pipeline is passed through a pipe-tensioning device and lowered underwater while under tension.

PATENTED AUG 17 1971    3,599,435

INVENTOR:
 ROBERT H. KOLB
BY: *Louis J. Bovasso*
 HIS ATTORNEY

INVENTOR:
  ROBERT H. KOLB
BY: *Louis J. Bovasso*
  HIS ATTORNEY

3,599,435

METHOD FOR LAYING COATED PIPELINES UNDERWATER

BACKGROUND OF THE INVENTION

1. Field of the Invention

This invention relates to pipe laying, and, more particularly, to a method and apparatus for laying coated pipelines underwater.

2. Description of the Prior Art

In recent years there has been increasing activity in the offshore drilling of oil and gas wells which has created a need for pipelines extending from the offshore sites to shore installations for carrying oil and/or gas.

The need for such pipelines has long been recognized but their realization has been beset by many problems. For instance, pipelines laid underwater and particularly in saline waters, must be adequately protected against corrosion by anticorrosion coatings which must in turn be protected from penetration by marine organisms and damage by other destructive forces. Furthermore, the laying of even steel pipe in water requires that the pipe be heavy enough to sink to the bottom and remain stable against the action of disturbing influences. The larger sizes of pipes, even though made of steel, are still so buoyant when laid in water that they float rather than sink to the bottom. It is obvious that some means must be provided for sinking such pipes and holding them in stable position on or below the bottom of the body of water.

Heretofore pipelines have been laid under the conditions referred to wherein the lengths of steel pipe were welded to a continuous length as the laying proceeded but were provided with either a heavy continuous coating of reinforced concrete sufficiently thick to provide the required weight or were provided with spaced weight collars or clamps that had to be individually secured to the pipe before the same was lowered below the surface of the water.

The lowering of such pipeline into the water from an upper position of assembly necessitates some bending of the pipe, whether it be coated or not. Pipes coated with concrete or other similar brittle coatings are relatively fragile and must be handled with extreme care, taking great pains to avoid bending beyond certain limits to avoid cracking of the coating and its loss completely from the pipe which would not only endanger the stability of the pipeline but would expose the corrosion protection coating to attack by marine organisms. The concrete coating thus serves the dual purpose of a weight coating as well as a shield to the anticorrosion coating from penetration by marine organisms. Lately, it has been suggested to coat such pipelines with a relatively thick corrosion-preventing masticlike material such as Somastic, a pipe-coating material having an asphalt base and manufactured by H. C. Price and Co., Morgan City, La. Such materials are commonly used to coat offshore pipelines for corrosion protection and are put on the pipeline with appreciable thickness. The masticlike material is then covered with a solidifying material, such as concrete, to provide the desired weight.

As marine pipe laying progresses to larger size pipelines and deeper depths, the tension forces required to lay the pipe successfully increase rapidly. There are many suitable pipe-tensioning devices which have been used to lay pipeline. One such device is described in a U.S. Pat. to Lawrence Ser. No. 3,390,532. In this device, a plurality of pairs of pneumatic-tired wheels, each pair of wheels being driven by a hydraulic motor, are disposed on a pipe lay barge and used to lay pipeline therefrom. The tension applied to the pipeline is controlled by hydraulic pressure to the motors. A separate hydraulic piston provides the normal force required to clamp the pipeline between the pair of wheels. One limitation of this and similar systems is the inability of the corrosion-preventive coating on the pipeline to resist damage from the wheels. If much additional tension is needed, as for example, for pipelines laid in deeper waters, such a device would cause extensive pipe-coating damage. The stripping of all or part of the concrete coating from the pipeline is likely to result. Further, when high-tension loads are applied to concrete-weighted masticlike material-coated pipelines by conventional pipe-tensioning devices or machines, tension failures of the outer concrete jacket occur when slippage takes place between the outer concrete shell and the underlying masticlike material coating.

SUMMARY OF THE INVENTION

It is an object of this invention to provide an improved method and apparatus for laying coated pipelines underwater.

It is a further object of this invention to prevent slipping of the concrete shell of masticlike material-coated pipelines which pipelines are to be laid underwater.

These and other objects may be accomplished by coating a substantial portion of the pipeline to be laid underwater with a corrosion-preventing masticlike material in its soft state, the material having a tendency to flow plastically. A plurality of raised portions are formed in the outer surface of the masticlike material while the material is in its soft state and the material including the raised portions is solidified. A cementatious material is applied over the hardened masticlike material; the cementatious material is then solidified and the coated pipeline is passed through a pipe-tensioning device and lowered underwater while under tension.

The raised portions on the masticlike material coating penetrate the cementatious material and thus key the cementatious material and the masticlike material coating together. This effectively reinforces the bond of the cementatious material to the masticlike material coating and prevents slipping at this interface.

By preventing slipping of the outer cementatious material coating along the masticlike material-coated surface of a pipeline, the resulting tensile failure of the outer cementatious material coating may be avoided at last until a much higher pipe-tensioning load is applied or until a high enough load is applied by the device or machine for a long enough period that the cementatious material coating moves due to a creep-type shear failure of the masticlike material coating. This permits the use of present pipe-tensioning methods in applications requiring tensions in excess of the loads present cementatious material masticlike material-coating pipelines can withstand, such as in deeper water depths and in the case of larger diameter pipelines.

DESCRIPTION OF THE PREFERRED EMBODIMENT

Figure 1:
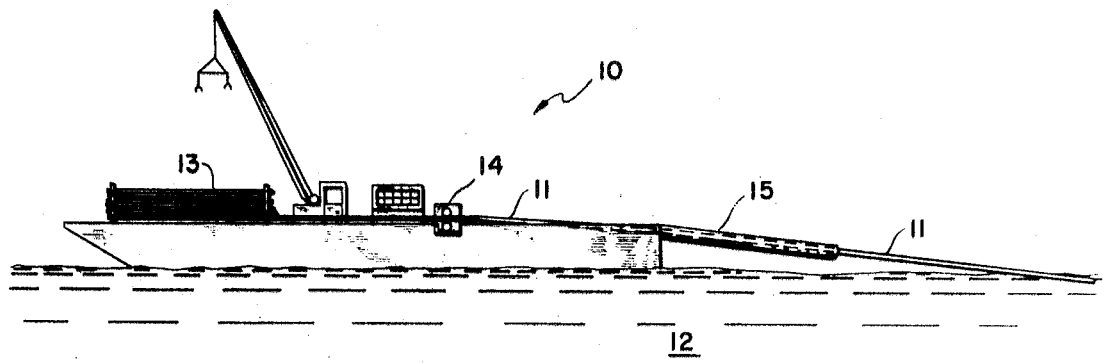
FIG. 1 is an isometric view of a pipe lay barge for laying a coated pipeline in accordance with the teachings of my invention.

Referring now to the drawing, FIG. 1 shows a conventional pipe lay barge 10 for lowering a coated pipeline 11 to the floor of a body of water, such as an ocean 12. Barge 10 includes the necessary equipment for making up pipeline 11 from a plurality of pipe sections 13, such as derricks, etc., racks, hoists, etc. all as is well known in the art. The pipeline 11 is preferably payed out from barge 10 as by passing the made-up pipe sections 13 through a conventional pipe-tensioning device 14 and along a stinger 15 whereby the pipeline 11 is lowered to the ocean bottom.

Figure 2:
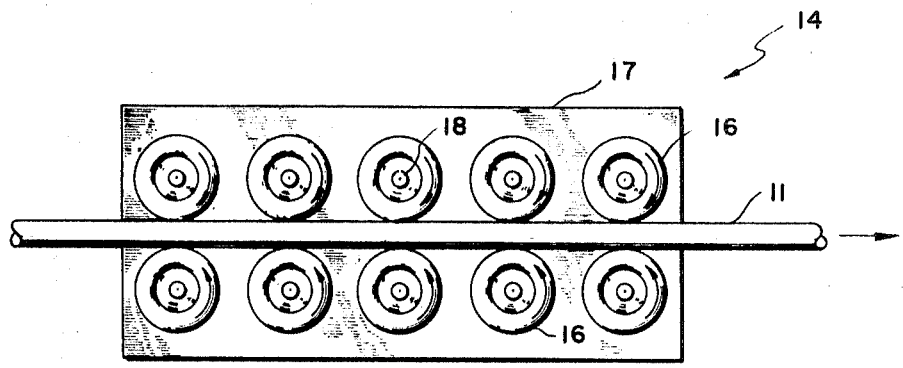
FIG. 2 is a detailed isometric view, partly diagrammatic, of a portion of the barge of FIG. 1.

Referring now to FIG. 2, the pipe-tensioning device 14 is shown in detail as comprising a plurality of pairs of pneumatic wheels 16 which grip and thereby apply tension to coated pipeline 11. Suitable operating mechanism, represented by block 17, engages shafts 18 coupled to both wheels 16 and block 17 for applying torque to wheels 16 and clamping wheels 16 to pipeline 11 all as is well known in the art. A suitable pipe-tensioning device and associated operating mechanism is described in the aforementioned patent to Lawrence. However, although a specific type of pipe-tensioning device has been herein disclosed, the concepts of my invention are applicable to any pipe-tensioning device or machine which applies tension directly to a pipeline, such as any mechanical gripping device that grips the coated pipeline and holds it under tension.

Figure 3:
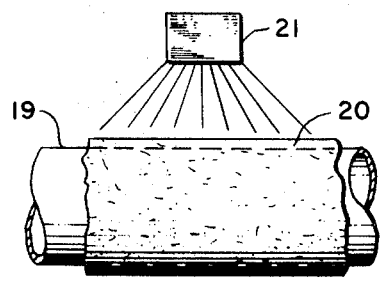
FIG. 3 is an enlarged view of a portion of a machine coating the pipeline in accordance with the teachings of my invention.

In order to prevent tension failures of the outer concrete coating of pipeline 11, a pipe portion 19 is shown in FIG. 3 which is provided with a coating 20 of corrosion-preventing masticlike material having a tendency to flow plastically. This coating 20 may be applied by a variety of techniques, as for example, by running the pipe portion 19 through a rotary extruder 21 and applying the masticlike material while it is hot. The masticlike material, such as the previously mentioned Somastic material, is automatically bonded to pipe portion 19 which is of steel or like material. The asphalt in the masticlike material aids in the automatic bonding to pipe portion 19. Suitable masticlike materials may include solvent and water based asphaltic emulsions, asphalt-butadiene latex mixtures, etc.

Figure 4:
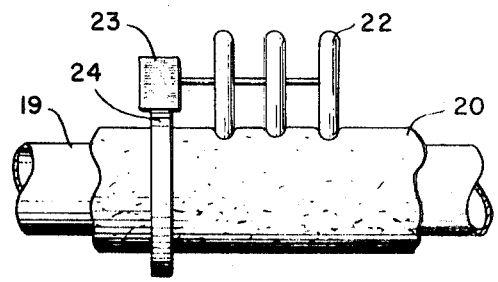
FIG. 4 is an enlarged view of a further step in coating the portion of pipeline of FIG. 3.
Figure 5:
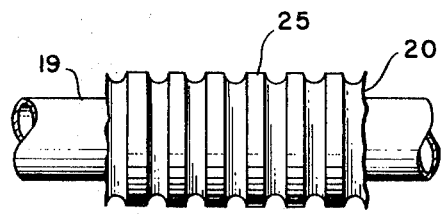
FIG. 5 is a vertical view of the semicompleted coated pipeline of FIG. 4.
Figure 6:
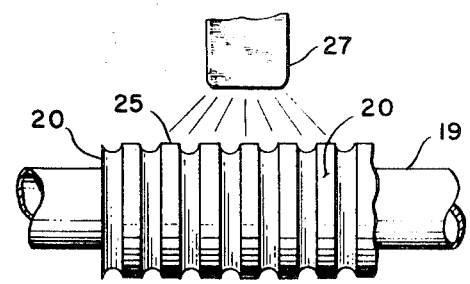
FIG. 6 is a vertical view of the final step of coating the portion of pipeline of FIG. 3.

Referring now to FIG. 4, while the coating 20 is still in its "soft" state, a pattern-making device, such as a plurality of wheels 22, three of which have been shown for convenience of illustration, may be run over masticlike coating 20 before it hardens. Motive means, such as a motor 23, may be coupled to both a frame 24 and pattern wheels 22 for rotation about coating 20. The coated pipe may also be pressed against a freely turning pattern wheel and then revolved (not shown). Of course, pattern wheels 22 may be manually rotated about coating 20, if desired. In this manner, a plurality of "raised portions" such as indentations or ridges 25 (FIG. 5) may be formed in coating 20. Although it is preferable to form such raised portions circumferential to the longitudinal axis of pipeline 19, obviously it is only necessary to apply some relief to outer coating 20 before it hardens. Thus, the raised portions may comprise helically extending ridges, indentations, tire tread patterns, spaced raised nubs, etc. The raised patterns may be applied in any suitable manner, as by rolling, pressing or grooving, preferably, however, while the masticlike material coating 20 is still warm and somewhat soft after its application to the pipe portion 19.

Figure 7:
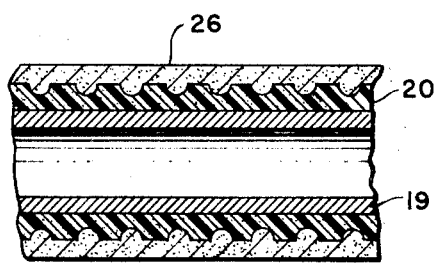
FIG. 7 is a vertical cross-sectional view of a portion of the pipeline of FIG. 3 after coating in accordance with the teaching of my invention; and, FIG. 8 is a vertical view of the final coated portion of the pipeline of FIG. 3.
Figure 8:
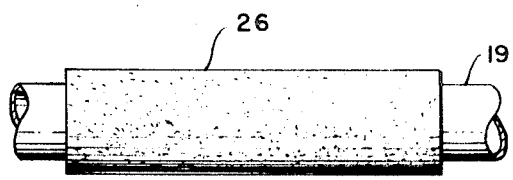

The ridged coating 20 is thus permitted to harden and a cementatious material, such as concrete, is disposed over hardened coating 20. The concrete is necessary to give desired weight to pipeline 11 as discussed hereinabove. This material may be sprayed, as for example, from a revolving wheel 27 which may revolve about pipe portion 19 as is well known in the art. The cementatious material penetrates the pattern formed on coating 20 and when it hardens, an outer coating 26 is formed (FIG. 7) which is automatically bonded to coating 20, and effectively reinforces the bonding of coating 26 to coating 20. Thus, coating 26 is "keyed" to coating 20 and prevents slipping at this interface when the finally coated pipeline (FIG. 8) is lowered from barge 10 in the manner discussed hereinabove with respect to FIGS. 1 and 2.

I claim as my invention:

1. A method of laying a pipeline on the bottom of a body of water comprising the steps of:

coating a portion of said pipeline with a corrosion-preventing masticlike material in its soft state, said material having a tendency to flow plastically;

forming *in situ* a plurality of raised portions in the outer surface of said masticlike material after applying said masticlike material and while said masticlike material is in its soft state;

maintaining said masticlike material in contact with said pipeline after forming said raised portions for a period of time sufficient to harden said masticlike material including said raised portions;

applying a cementatious material over said hardened masticlike material;

maintaining said cementatious material in contact with said masticlike material for a period of time sufficient to harden said cementatious material, thereby keying said cementatious material to said masticlike material; and passing said coated pipeline under tension into said body of water.

2. The method of claim 1 wherein the step of forming a plurality of raised portions includes the step of running a pattern-forming device over said soft masticlike material at a plurality of locations along said pipeline.

3. The method of claim 1 wherein the step of passing said coated pipeline under tension into said body of water includes the steps of passing said coated pipeline through a pipe-tensioning device which is adapted to grip said pipeline and hold said pipeline under tension, said device being disposed on the surface of said body of water; and lowering said coated pipeline from said pipe-tensioning device while under tension to the bottom of said body of water.

4. The method of claim 1 wherein the step of forming a plurality of ridges in said soft masticlike material at a plurality of locations along said pipeline, said ridges extending substantially circumferentially of said pipeline with respect to the longitudinal axis thereof.

5. The method of claim 1 wherein the step of applying a cementatious material includes the step of applying a concrete material over said hardened masticlike material.